(12) United States Patent
Ito et al.

(10) Patent No.: US 11,021,071 B2
(45) Date of Patent: Jun. 1, 2021

(54) ELECTRIC WORK VEHICLE

(71) Applicant: Kubota Corporation, Osaka (JP)

(72) Inventors: Hirokazu Ito, Sakai (JP); Yasuhiro Manji, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 16/411,473

(22) Filed: May 14, 2019

(65) Prior Publication Data

US 2019/0381900 A1  Dec. 19, 2019

(30) Foreign Application Priority Data

Jun. 19, 2018 (JP) .............................. JP2018-116428

(51) Int. Cl.
| | |
|---|---|
| *B60L 50/60* | (2019.01) |
| *B60L 58/18* | (2019.01) |
| *B60L 58/12* | (2019.01) |
| *A01D 69/02* | (2006.01) |
| *A01D 34/66* | (2006.01) |
| *A01D 34/78* | (2006.01) |
| *A01D 101/00* | (2006.01) |

(52) U.S. Cl.
CPC .............. *B60L 50/66* (2019.02); *A01D 69/02* (2013.01); *B60L 58/12* (2019.02); *B60L 58/18* (2019.02); *A01D 34/66* (2013.01); *A01D 34/78* (2013.01); *A01D 2101/00* (2013.01)

(58) Field of Classification Search
CPC ........... B60R 16/04; B60L 50/66; B60L 58/18
See application file for complete search history.

(56) References Cited

U.S. PATENT DOCUMENTS

| | | | | |
|---|---|---|---|---|
| 3,821,997 | A | * | 7/1974 | Sieren ..................... B60R 16/04 180/68.5 |
| 5,983,612 | A | * | 11/1999 | Bauswell ............... A01D 69/02 180/65.1 |
| 7,578,116 | B1 | * | 8/2009 | Howell .................. A01D 69/02 56/11.9 |
| 8,973,691 | B2 | | 3/2015 | Morgan et al. |
| 9,101,060 | B2 | * | 8/2015 | Yamanaka ............. B60R 16/04 |
| 9,276,422 | B2 | * | 3/2016 | Hotta .................. H01M 10/425 |
| 9,579,963 | B2 | | 2/2017 | Landgraf |
| 2012/0186887 | A1 | | 7/2012 | Moriguchi et al. |
| 2014/0062352 | A1 | * | 3/2014 | Wang ..................... A01D 34/78 318/139 |
| 2017/0135283 | A1 | | 5/2017 | Ito et al. |

FOREIGN PATENT DOCUMENTS

| | | |
|---|---|---|
| DE | 102013210575 A1 | 5/2014 |
| JP | 5777855 B | 9/2015 |
| JP | 201786001 A | 5/2017 |

* cited by examiner

*Primary Examiner* — John D Walters
*Assistant Examiner* — James J Triggs
(74) *Attorney, Agent, or Firm* — The Webb Law Firm

(57) ABSTRACT

Disclosed is an electric work vehicle that includes a traveling vehicle body, a wheel unit having wheels on the right and left sides of the traveling vehicle body, a motor for supplying rotational drive force to the wheel unit, and a battery for supplying electric power to the motor. The battery includes a first battery disposed at a right/left center of the traveling vehicle body, and second batteries disposed in right/left symmetricity on the traveling vehicle body to act as supplementary batteries.

9 Claims, 5 Drawing Sheets

ELECTRIC WORK VEHICLE

CROSS-REFERENCE TO RELATED APPLICATION

This application claims priority to Japanese Patent Application No. 2018-116428, filed Jun. 19, 2018, the disclosure of which is hereby incorporated by reference in its entirety.

BACKGROUND OF THE INVENTION

1. Field of the Invention

The present invention relates to an electric work vehicle having driving wheels driven by a motor.

2. Description of the Related Art

JP 2017-086001 A or US 2017/0135283 A1 corresponding thereto discloses an electric work vehicle including a rear wheel unit consisting of a left rear wheel and a right rear wheel, a front wheel unit consisting of a left front wheel and a right front wheel, a motor for providing rotational drive to the rear wheel unit, and a battery for supplying electric power to the motor. The rear wheel unit is rotatably driven as receiving a predetermined rotational power from the motor and the front wheel unit is rotated in accordance with the rotational driving of the rear wheel unit. Supply amounts of rotational driving power of the motor to the left rear wheel and the right rear wheel included in the rear wheel unit are controlled independently of each other, so that rotational speeds of the left rear wheel and the right rear wheel can be made different from each other. With this, a speed difference is produced between the right and left rear wheels, so that a turn of the electric work vehicle is effected.

In an electric work vehicle, the rear wheel unit is rotatably driven as receiving rotational drive from the motor to effect its forward traveling, a turning, etc. Whereby, it is necessary to mount on the electric work vehicle a battery capable of securing a sufficient amount of stored electric power in order to supply electric power to the motor. However, there is a desire for consideration on an appropriate disposing positon for the battery when such battery is to be mounted on the electric work vehicle.

Namely, there is a need for an electric work vehicle having a battery that is disposed at an appropriate position.

SUMMARY OF THE INVENTION

In view of the above, there is provided an electric work vehicle having an arrangement as below:

An electric work vehicle comprising:
 a traveling vehicle body;
 a wheel unit having wheels on the right and left sides of the traveling vehicle body;
 a motor for supplying rotational drive force to the wheel unit;
 a battery for supplying electric power to the motor, the battery including:
  a first battery disposed at a right/left center of the traveling vehicle body; and
  second batteries disposed in symmetricity across the right/left center.

With the above-described arrangement, as the battery for supplying electric power to the motor for rotatably driving the wheel unit, second batteries are provided in addition to a first battery. Thus, in comparison with an arrangement having only first battery, it is possible to secure sufficient amount of stored electric power in the battery as a whole. Therefore, it is possible to secure a long driving period for the wheel unit, and to secure a long operational period for the electric work vehicle eventually.

Further, since the first battery is disposed at the approximate center in the right/left direction of the traveling vehicle body and the second batteries are disposed substantially in symmetry in the right/left direction of the traveling vehicle body, there is achieved good weight balance for the electric work vehicle in the right/left direction. Thus, it is possible to suppress tilting of the gravity center of the electric work vehicle to either right or left side, thereby to allow smooth traveling/stopping of the electric work vehicle.

Moreover, as the second batteries are disposed on either right or left side respectively of the traveling vehicle body, they can be readily mounted/dismounted from the right and left sides respectively of the traveling vehicle body.

According to one preferred embodiment, the first battery is disposed at a rear portion of the traveling vehicle body; and the second batteries are disposed in right/left symmetry across the first battery at the rear portion of the traveling vehicle body.

With the above-described arrangement, since the first battery is disposed at a rear portion of the traveling vehicle body and the second batteries are disposed substantially in right/left symmetry across the first battery, in the electric work vehicle having free space at the rear portion of the traveling vehicle body, it is possible to employ a battery layout taking weight balance into consideration.

According to one preferred embodiment, the first battery is disposed at a front portion of the traveling vehicle body; and the second batteries are disposed at rear portions of the traveling vehicle body across a right/left centerline of the first battery.

With the above-described arrangement, since the first battery is disposed at a front portion of the traveling vehicle body and the second batteries are disposed at a rear portion of the traveling vehicle body across a right/left centerline of the first battery, in the electric work vehicle having free space at the front portion of the traveling vehicle body, it is possible to employ a battery layout taking weight balance into consideration.

According to one preferred embodiment, the electric work vehicle further comprises right and left fenders that are disposed on the right and left sides of the traveling vehicle body, respectively, wherein the second batteries are disposed in correspondence with the respective fenders.

With the above-described arrangement, since the second batteries are disposed in correspondence with the fenders extending in the right/left direction of the traveling vehicle body, the second batteries do not prominently project from the right and left sides of the traveling vehicle body, so that the electric work vehicle as a whole can be formed compact.

According to one preferred embodiment, the second batteries include a second right battery disposed on the right side of the traveling vehicle body and a second left battery disposed on the left side of the traveling vehicle body; and the second left battery and the second right battery are identical in shape and weight to each other.

With the above-described arrangement, since the second left battery and the second right battery are identical in shape and weight, there is achieved good weight balance in the right/left direction of the electric work vehicle.

According to one preferred embodiment, the electric work vehicle further comprises a switching mechanism for manually or automatically switching between the first battery and the second batteries.

With the above-described arrangement, since there is provided a switching mechanism for manually or automatically switching between the first battery and the second batteries, if the stored power amount in the first battery becomes short, it is possible to manually or automatically switch to the second batteries, whereby power can now be supplied to the motor from the second batteries and a long operational time can be secured for the electric work vehicle.

Further, with provision of the switching mechanism, when charging is effected for the battery, charging of the first battery and charging of the second batteries can be effected independently of each other, so that degree of freedom in battery charging can be increased.

Further, since the switching mechanism allows the power supply from the first battery to the motor and the power supply from the second batteries to the motor to be effected independently of each other, so that even when stored power amounts are different between the first battery and the second batteries, it is possible to suppress power charging/discharging between the first battery and the second batteries According to one preferred embodiment, the switching mechanism controls an electric power amount supplied from the first battery to the motor and an electric power amount supplied from the second batteries to the motor to be substantially equal to each other.

With the above-described arrangement, a user can switch over between the first battery and the second batteries in correspondence with the displaying of the stored power amounts and in response to an alarming corresponding to such stored power amounts.

According to one preferred embodiment, the electric work vehicle further comprises a stored electric power control section configured to effect at least one of (i) a display control for displaying stored power amounts stored in the first battery and the second batteries and (ii) an alarm control for effecting alarming in accordance with the stored power amounts.

With the above-described arrangement, since the power amounts supplied from the first and second batteries respectively to the motor are substantially equal, even after switching over between the first battery and the second batteries, the wheel unit will not be affected by change in the electric power amount before/after the switchover, thus being driven smoothly.

Further and other characterizing features and advantages achieved thereby will become apparent upon reading the following description.

DETAILED DESCRIPTION OF PREFERRED EMBODIMENTS

Regarding an electric work vehicle according to the invention, preferred embodiments will be described next using as an example thereof, a riding electric lawn mower called a "zero-turn" mower having a mower unit mounted on a vehicle body. Unless indicated otherwise, a "front/rear direction" used in the detailed disclosure means a longitudinal direction of a vehicle body of the riding electric lawn mower which is the traveling direction of the riding electric work vehicle. A "lateral direction", a "transverse direction" or a "right/left direction" means a direction horizontally traversing the vehicle body longitudinal direction. And a "vertical direction" or a "height direction" means the direction of the normal relative to the ground surface or the vehicle body horizontal plane.

The riding electric work vehicle mounts thereon batteries for supplying electric power to a driving wheel unit having driving wheels, a mower unit having mower blades for mowing grass or lawn, etc. As a layout of the batteries, there are e.g. a type relating to a first embodiment in which the batteries are disposed at a rear portion of the riding electric lawn mower, and another type relating to a second embodiment in which the batteries are disposed in distribution at a front portion and a rear portion of the riding electric lawn mower. As typical examples, riding electric lawn mowers of each type will be described hereinafter.

First Embodiment

[General Arrangement]

Figure 1:
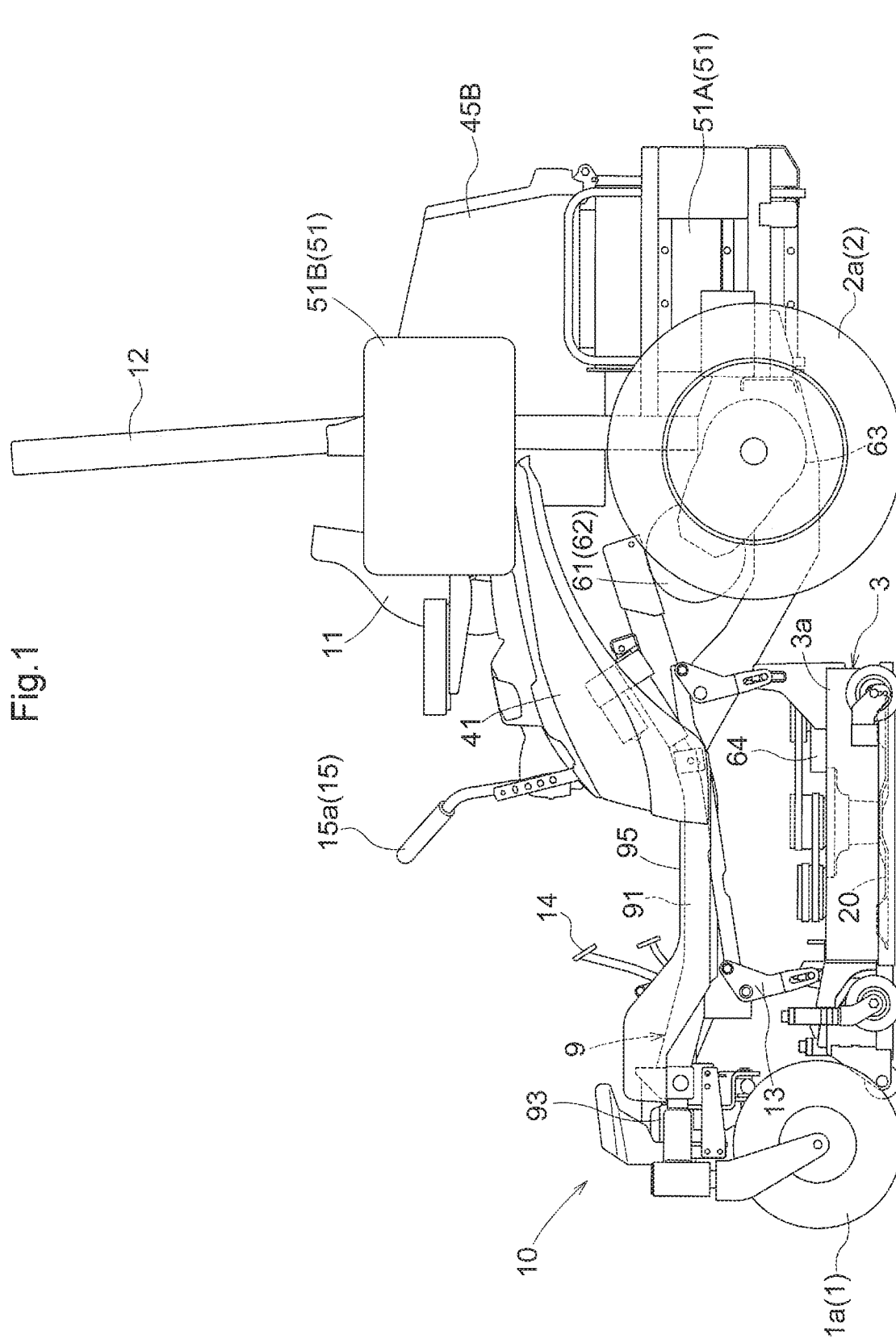
FIG. 1 is a side view of a riding electric lawn mower relating to a first embodiment.
Figure 2:
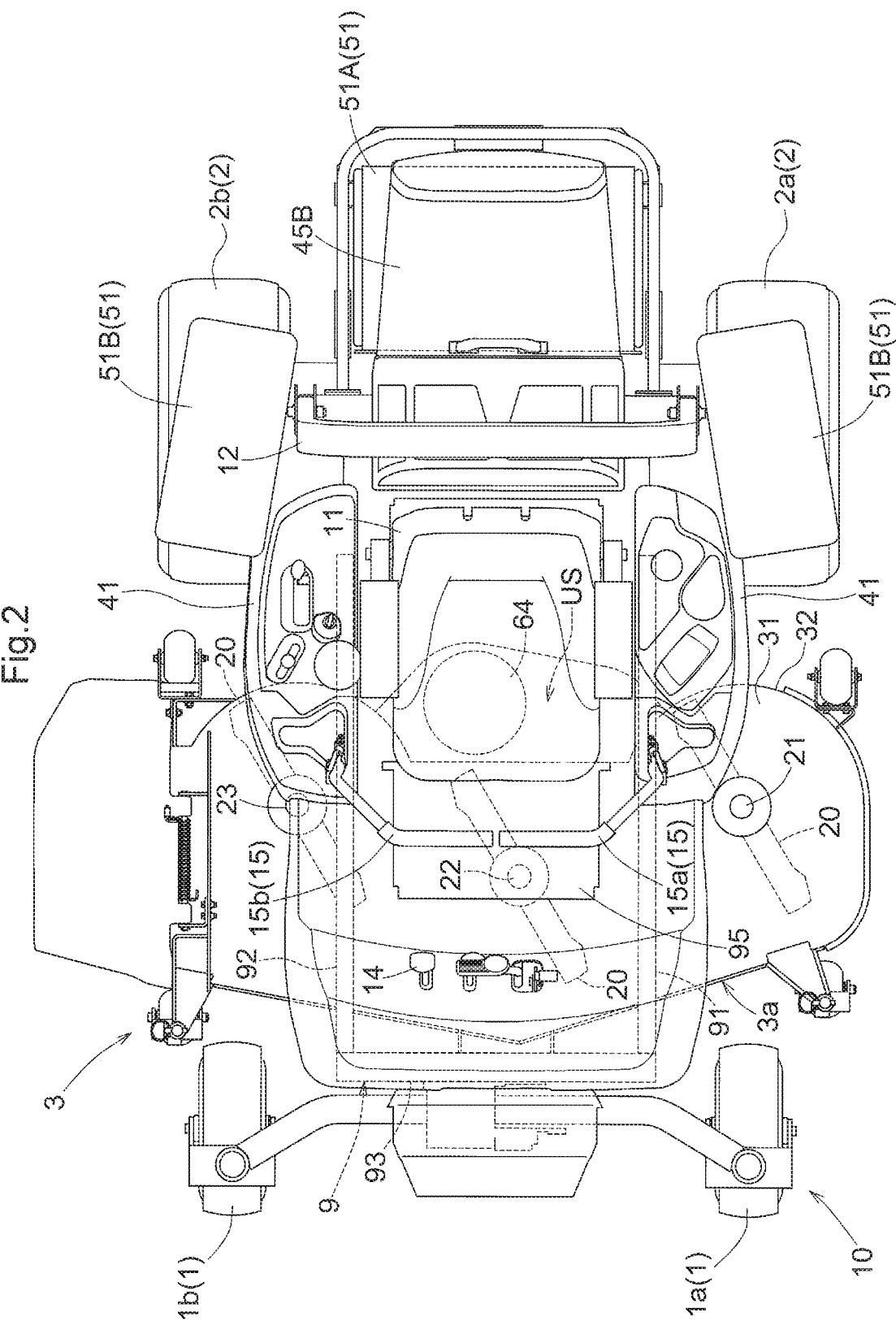
FIG. 2 is a plan view of the riding electric lawn mower relating to the first embodiment.

As shown in FIG. 1 and FIG. 2, the riding electric lawn mower of the type relating to the first embodiment includes a frame unit 9 as a basic structure of a traveling vehicle body 10. The frame unit 9 includes a left frame 91 and a right frame 92 which extend in the vehicle body front/rear direction, a plurality of cross frames 93 interconnecting the right and left frames, and a floor plate 95 around a driver's seat 11. The frame unit 9 is supported on a ground surface via a front wheel unit 1 consisting of freely rotatable caster type left front wheel 1a and right front wheel 1b, and a driving wheel unit 2 consisting of a left rear wheel 2a and a right rear wheel 2b. At a rear portion of the frame unit 9, the driver's seat 11 is disposed and in the periphery of the driver's seat 11, there are provided a pair of right and left fenders 41.

Further, from the rear side of the driver's seat 11, a ROPS (rollover protection structure) frame 12 is mounted vertically. Rearwardly of the ROPS frame 12, a rear hood 45B is provided.

Further, between the front wheel unit 1 and the driving wheel unit 2 and in a space beneath the frame unit 9, a mower unit 3 is suspended from the frame unit 9 to be liftable up/down via a lift link mechanism provided as a lift mechanism 13.

Forwardly of the driver's seat 11, there is provided a floor plate 95 as a "footrest" for the foot of the driver, from which a brake pedal 14 protrudes. On the opposed sides of the driver's seat 11, there is provided a maneuvering unit 15 consisting of a left maneuvering lever 15a and a right maneuvering lever 15b which are pivotable about a horizontal pivot axis in the vehicle body transverse direction.

Though not shown, around the driver's seat 11, there are disposed operational tools such as a mower blade operational lever, a mower unit lift pedal, etc.

[Batteries]

In the riding electric lawn mower, the driving wheel unit 2 and the mower unit 3 are driven by electric power. Thus, the riding electric lawn mower includes a battery 51 for supplying electric power to these units 2, 3. In the case of the electric lawn mower relating to the instant embodiment, the battery 51 includes a main battery (an example of a "first battery") 51A and supplementary batteries (an example of a "second batteries") 51B. The main battery 51A has an approximately rectangular parallelepiped body and is disposed rearwardly of the driver's seat 11. More specifically, this main battery 51A is disposed in such a manner that the right/left center of this main battery 51A is in substantial alignment with the right/left center of the traveling vehicle body 10. In the instant embodiment, the main battery 51A may be disposed beneath the rear hood 45B, for instance. However, the main battery 51A can be alternatively disposed within the rear hood 45B.

Further, in the traveling vehicle body 10, as shown in FIG. 1 and FIG. 2, there are provided a pair of right and left supplementary batteries 51B (second left battery and second right battery). The supplementary batteries 51B are used for supplementing electric power when there is shortage in the stored electric power in the main battery 51A. The pair of supplementary batteries 51B are disposed at rear portions of the traveling vehicle body 10 and substantially in symmetry relative to the right/left center of the traveling vehicle body 10 across the main battery 51A. In the instant embodiment, the pair of right and left supplementary batteries 51B are disposed rearwardly of the driver's seat 11. Further, in this embodiment, the pair of right and left supplementary batteries 51B are disposed on the respective fenders 41, with at least a part of the supplementary battery 51B being overlapped with the fender 41 associated therewith as seen from above.

Each of the right and left supplementary batteries 51B is approximately rectangular parallelepiped, and they are identical in shape and weight to each other. Thus, even when the supplementary batteries 51B are provided in addition to the main battery 51A, it is still possible to keep favorable weight balance in the right/left direction of the riding lawn mower.

[Mower Unit]

As shown in FIG. 2, a mower deck 3a constituting the mower unit 3 has a top wall 31 and a side wall 32. The side wall 32 extends downwards from the outer circumferential edge of the top wall 31, and in the instant embodiment extending perpendicularly downwards from the outer circumferential edge. With the top wall 31 and the side wall 32, the mower deck 3a creates an inside space which is open to the ground surface. And, in this inside space, mower blades 20 are accommodated. These mower blades 20 are attached to respective lower ends of a first rotational shaft 21, a second rotational shaft 22 and a third rotational shaft 23 that extend upwards through the top wall 31 of the mower deck 3a substantially in the perpendicular direction. In the example as shown in FIG. 2, the first rotational shaft 51 is disposed on the left side of the vehicle body, the second rotational shaft 22 is disposed at the substantially transverse center of the vehicle body, and the third rotational shaft 23 is disposed on the right side of the vehicle body, with rotational loci of two adjacent mower blades 20 being slightly overlapped with each other. The rotational loci continuous in the lateral direction of the three mower blades 20 define the mowing width of this lawn mower.

More particularly, the mower blade 20 located at the center in the vehicle body transverse direction (right/left direction) protrudes in the vehicle body forward traveling direction relative to the mower blade 20 disposed on the left side and the mower blade 20 disposed on the right side. In other words, the second rotational shaft 22 protrudes more to the front side in the vehicle body front/rear direction than the first rotational shaft 21 on the left side and the third rotational shaft 23 on the right side. With this arrangement, an unused space is created on the outer side of the rotational loci of the three mower blades 20, in particular, on the rear side of the vehicle body as seen in the plan view. As shown in FIG. 2, such an unused space is located on the rear side of the rotational locus of the center mower blade 20, and on the right side of the rotational locus of the left side mower blade 20 and on the left side of the rotational locus of the right side mower blade 20.

In the example as shown in FIG. 2, the side wall 32 of the mower deck 3a is caused to protrude forward, the unused space forms an available space US at the rear center portion of the mower deck 3a; and in this available space US, a blade motor 64 which receives electric power from the battery 51 is disposed.

[Electric System and Power Transmitting System]

Figure 3:
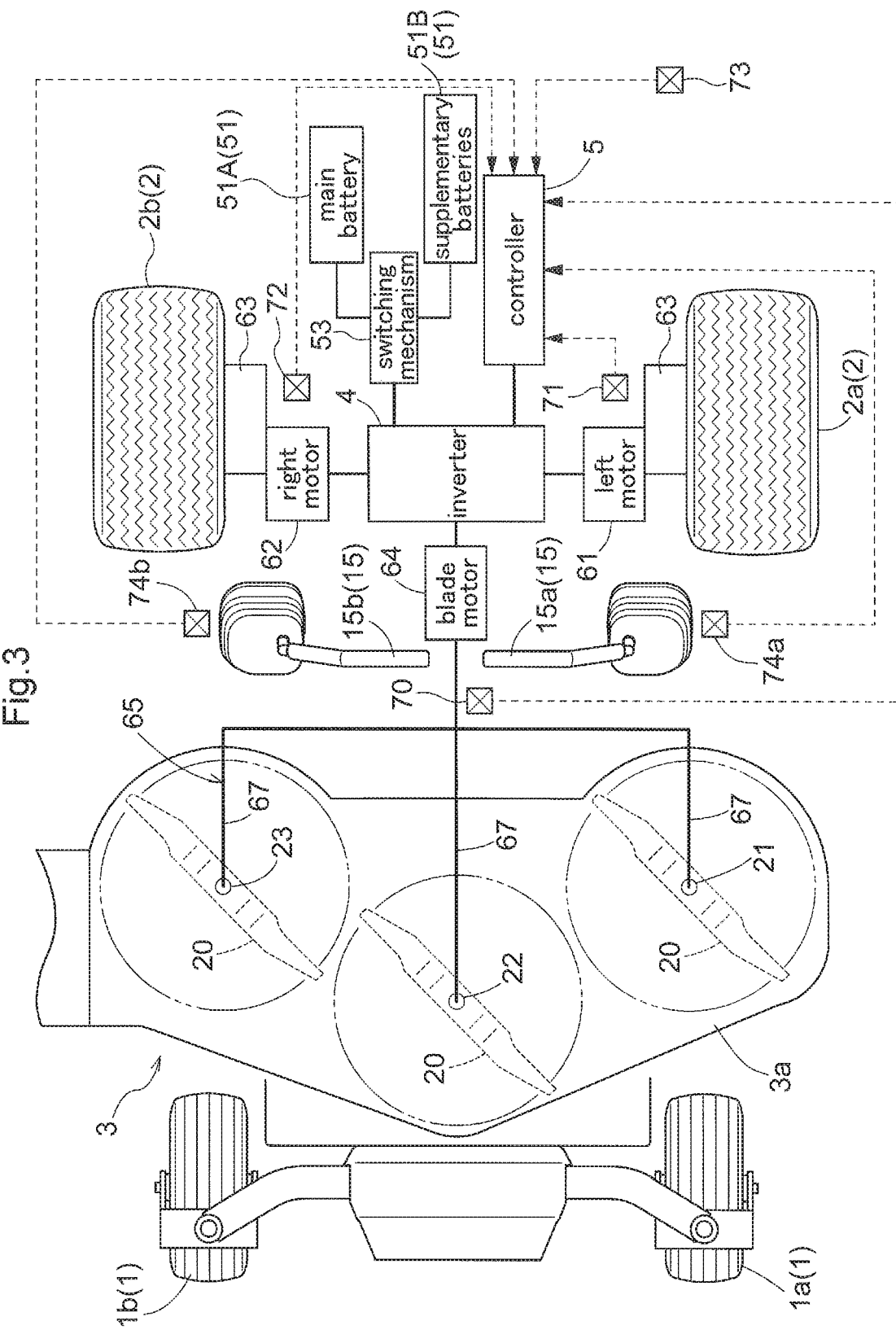
FIG. 3 is a system diagram showing an electric system and a power transmitting system of the riding electric lawn mower.

As shown in FIG. 3, there are mounted a left motor 61 and a right motor 62 as electric actuators for rotatably driving the left rear wheel 2a and the right rear wheel 2b, respectively. Rotational speeds of the left motor 61 and the right motor 62 are varied independently of each other in accordance with amounts of electric power supplied independently thereto from the battery 51 (the main battery 51A and the supplementary batteries 51B) via an inverter 4. Therefore, rotational speeds of the left rear wheel 2a and the right rear wheel 2b can be made different from each other; and with the speed difference between the two rear wheels, a turn of the riding electric lawn mower is effected. Incidentally, in the instant embodiment, for power transmissions between the left motor 61 and the left rear wheel 2a and between the right motor 62 and the right rear wheel 2b, respective traveling drive mechanisms 63 are provided.

In the battery 51, the main battery 51A and the supplementary batteries 15B are connected to the inverter 4 switchably by a switching mechanism 53. Thus, as being switched by the switching mechanism 53, the inverter 4 will be connected selectively to either the main battery 51A or the supplementary batteries 51B. The switching mechanism 53 can comprise a mechanism such as a switch and a relay, and can be switched manually or automatically.

With provision of the switching mechanism 53 for switching over between the main battery 51A and the supplementary batteries 51B as described above, when the stored power amount in the main battery 51A becomes short, it is possible to switch over from the main battery 51A to the supplementary batteries 51B manually or automatically. Thus, in the event of shortage of power supply by the main battery 51A via the inverter 4 to the motors such as the left motor 61, the right motor 62 and the blade motor 64, etc., by switching from the main battery 51A to the supplementary batteries 51B, power can be supplied from the supplementary batteries 51B to the motors, so that a long working period for the riding electric lawn mower can be secured.

Further, with the provision of the switching mechanism 53, power charging can be effected separately to the main battery 51A and to the supplementary batteries 51B, thus degree of freedom in charging can be increased.

Moreover, since the switching mechanism 53 allows power supply to the motors from the main battery 51A and power supply to the motors from the supplementary batteries 51B to be effected independently, even if stored power amounts are different between the main battery 51A and the supplementary batteries 51B, power charging/discharging between the main battery 51A and the supplementary batteries 51B can be suppressed.

Preferably, the switching mechanism 53 is configured to control the power amount from the main battery 51A to the motors and the power amount from the supplementary batteries 51B to the motors to be substantially equal to each other. Then, as the amounts of power supplied to the motors from the main battery 51A and the supplementary batteries 51B are made substantially equal to each other, even when switchover is effected between the main battery 51A and the supplementary batteries 51B, this will not result in any change in the amount of electric power supplied to the driving wheel unit 2 and the mower unit 3 before/after the switchover, so that these units 2, 3 can be driven smoothly.

On the traveling vehicle body 10, there are disposed a left rotational speed detection sensor 71 functioning as a left rotational speed measurement section for detecting rotation (rotational speed) of the left motor 61 or the left rear wheel 2a, and a right rotational speed detection sensor 72 functioning as a right rotational speed measurement section for detecting rotation (rotational speed) of the right motor 62 or the right rear wheel 2b. Further, on the traveling vehicle body 10, there are also disposed a yawing rate detector 70 for detecting yawing of the traveling vehicle body 10, an acceleration sensor 73 for detecting an acceleration state of the traveling vehicle body 10, a left maneuvering angle detection sensor 74a and a right maneuvering angle detection sensor 74b.

As shown in FIG. 2 and FIG. 3, the mower unit 3 in the instant embodiment is of a side discharge type having the three mower blades (also simply referred to as "blades" hereinafter) 20. The three mower blades 20 are rotatably supported by a mower deck 3. Each mower blade 20 has mower blade edges at its opposed ends, and also has a wind vane formed on the rear side of each mowing blade edge. At a time of grass (lawn) mowing work traveling, grass clippings cut/mowed by the blades 20 will be guided by a wind generated by the wind vanes of the blades 20 toward the baffle plate; and thereby conveyed inside the mower deck 3a to one lateral end side where a discharge opening is located; and then discharged via this discharge opening to the lateral outer side of the mower deck 3a. A blade driving mechanism 65 for rotatably driving the three mower blades 20 consists of the blade motor 64 as an electric actuator, and a blade power transmission mechanism 67 for transmitting power of the blade motor 64 to the mower blades 20.

[Other Arrangements]

The power supplies to the left motor 61 and the right motor 62 for traveling and to the blade motor 64 for mowing via the inverter 4 are effected automatically under an inverter control by a controller 5 which is also referred to as an ECU (electric control unit). However, these power supplies via the inverter 4 to the left motor 61 and the right motor 62 and to the blade motor 64 for mowing can be switched over with a manual operation by a user of an unillustrated operational unit.

Further, though the left motor 61, the right motor 62 and the blade motor 64 are provided in the above-described arrangement, these motors can be configured as a single motor and power can be supplied from this single motor for providing rotational drives to the driving wheel unit 2 and the motor unit 3 in distribution.

As the battery 51 for supplying electric power to the motors for rotatably driving the driving wheel unit 2 and the mower unit 3, there are provided the main battery 51A and the supplementary batteries 51B. Thus, in comparison with an arrangement having only the main battery 51A, it is possible to ensure a sufficient stored power amount in the battery 51 as a whole. Therefore, it is possible to secure a long operational period for the driving wheel unit 2 and consequently a long operational period for the riding electric lawn mower.

Moreover, since the main battery 51A is disposed substantially at the right/left center at a rear portion of the traveling vehicle body 10 and the supplementary batteries 51B are disposed substantially in right/left symmetry at the rear portion of the traveling vehicle body 10, there is obtained favorable weight balance in the right/left direction of the riding electric lawn mower. Thus, with effective suppression of tilting of the gravity center of the riding electric lawn mower to either right or left side, the riding electric lawn mower can travel and make a stop, etc. smoothly.

Moreover, as the supplementary batteries 51B are disposed on the right and left sides of the traveling vehicle body 10, these can be readily mounted/dismounted from the right and left sides respectively of the traveling vehicle body 10. Thus, when the supplementary batteries 51B are not needed, these supplementary batteries 51B can be readily dismounted. On the other hand, when the supplementary batteries 51B become necessary, the supplementary batteries 51B can be readily mounted. Thus, the work period associated with mounting and dismounting of the supplementary batteries 51B can be reduced advantageously.

Incidentally, in the riding electric lawn mower relating to the first embodiment, the main battery 51A is disposed at a rear portion of the traveling vehicle body 10, and the supplementary batteries 51B are disposed substantially in right/left symmetry across the main battery 51A. Whereby, in the riding electric lawn mower having a free space at the rear portion of the traveling vehicle body 10, it is possible to employ a battery layout taking weight balance into consideration.

Further, in the instant embodiment, since the supplementary batteries 51B are disposed respectively in correspondence with the fenders 41 that are provided on the right and left sides of the traveling vehicle body 10, these supplementary batteries 51B do not protrude from the right and left sides of the traveling vehicle body 10 prominently, so that the riding electric lawn mower can be formed compact.

Second Embodiment

[General Arrangement]

Figure 4:
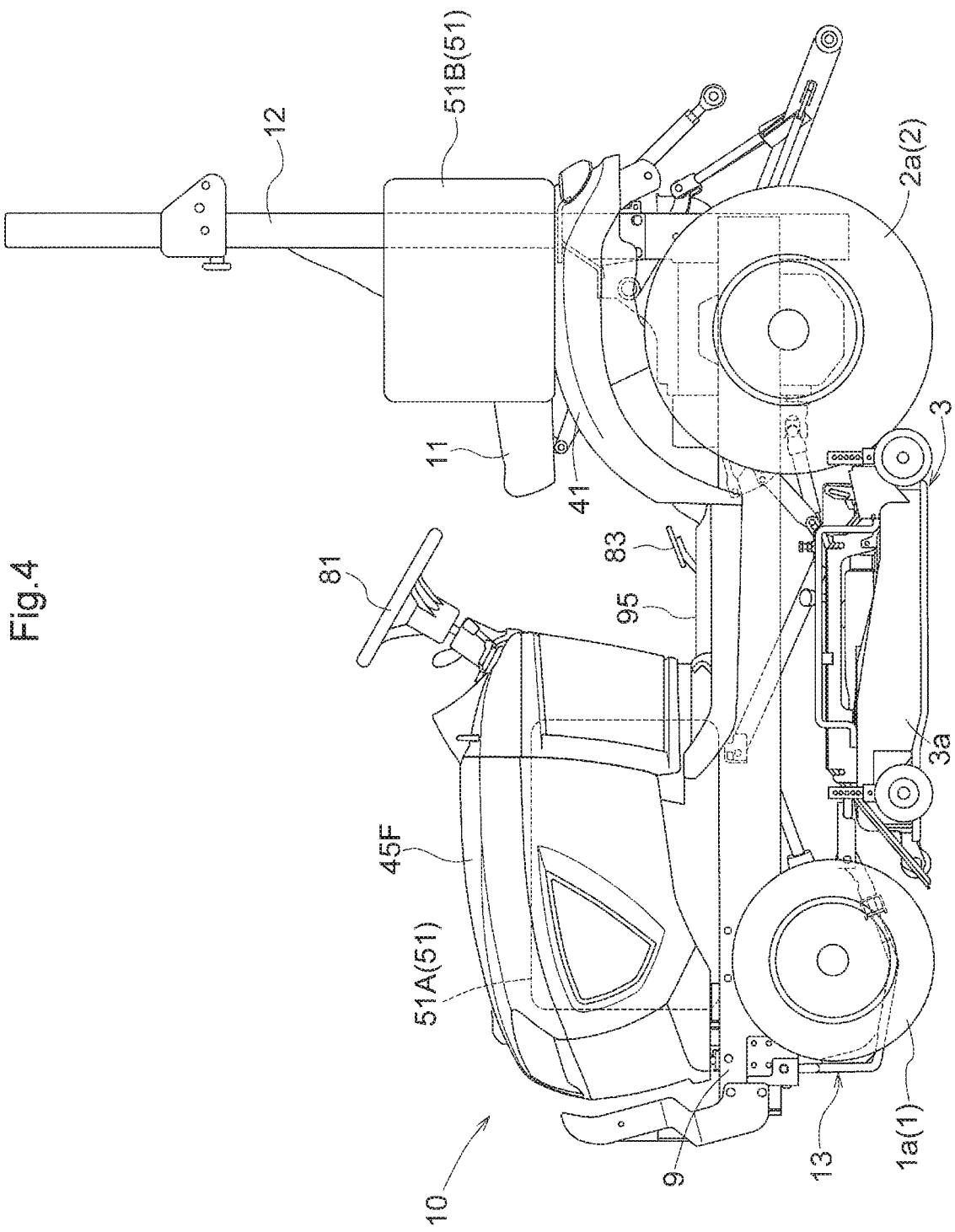
FIG. 4 is a side view of a riding electric lawn mower relating to a second embodiment.
Figure 5:
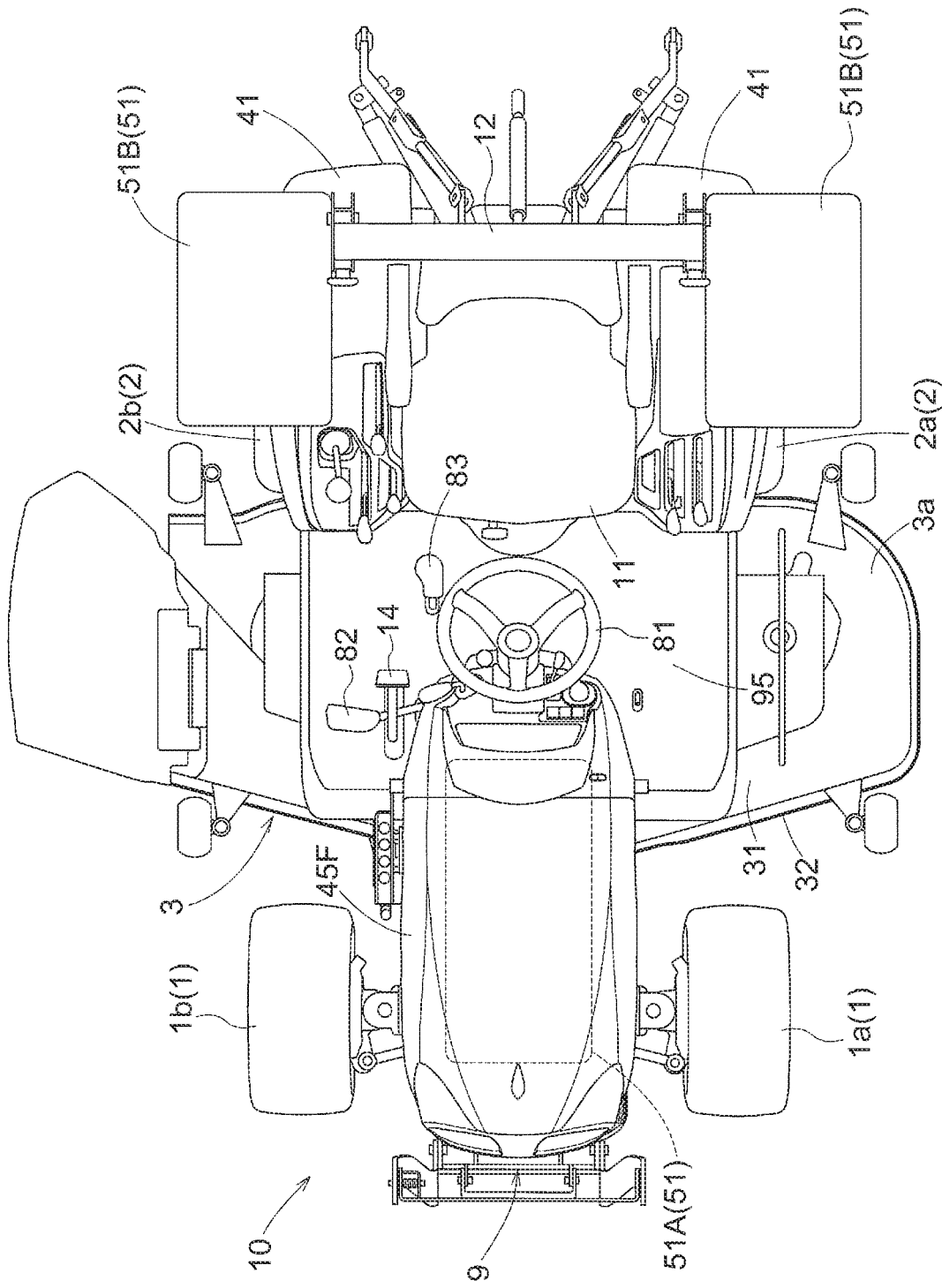
FIG. 5 is a plan view of the riding electric lawn mower relating to the second embodiment.

With reference to FIG. 4 and FIG. 5, a riding electric lawn mower of the type relating to a second embodiment will be described next. In the riding electric lawn mower relating to the first embodiment, the batteries are disposed at a rear portion of the riding electric lawn mower. Compared therewith, the riding electric lawn mower relating to the second embodiment differs in the basic arrangement thereof in that the batteries are disposed at a front portion and a rear portion of the riding electric lawn mower.

The riding electric lawn mower of the type relating to the second embodiment includes a frame unit 9 as a basic structure of a traveling vehicle body 10. The frame unit 9 includes a left frame and a right frame and a plurality of cross frames interconnecting the right and left frames, and a floor plate 95 around a driver's seat 11. The frame unit 9 is supported on a ground surface via a front wheel unit 1 consisting of freely rotatable caster type left front wheel 1a and right front wheel 1b, and a driving wheel unit 2 consisting of a left rear wheel 2a and a right rear wheel 2b.

At a rear portion of the frame unit 9, the driver's seat 11 is disposed; and in the periphery of the driver's seat 11, there are provided a pair of right and left fenders 41.

Further, from the rear side of the driver's seat 11, a ROPS (rollover protection structure) frame 12 is mounted vertically.

Further, between the front wheel unit 1 and the driving wheel unit 2 and in a space beneath the frame unit 9, a mower unit 3 is suspended from the frame unit 9 to be liftable up/down via a lift link mechanism provided as a lift mechanism 13.

Forwardly of the driver's seat 11, there is provided a floor plate 95 as a "footrest" for the foot of the driver, from which a brake pedal 14, a forward traveling speed changer pedal 82 and a reverse traveling speed changer pedal 83 coupled to a trunnion shaft of HST (hydrostatic transmission), etc. protrude. Forwardly of the driver's seat 11, there is disposed a steering wheel 81 for steering the front wheels. Forwardly of the steering wheel 81, a front hood 45F is provided.

Though not shown, around the driver's seat 11, there are disposed operational tools such a mower blade operational lever, a mower unit lift pedal, etc.

[Batteries]

In the riding electric lawn mower, the driving wheel unit 2 and the mower unit 3 are driven by electric power. The riding electric lawn mower includes a battery 51 for supplying electric power to these units 2, 3. In the electric lawn mower relating to the instant embodiment, the battery 51 includes a main battery (an example of a "first battery") 51A and supplementary batteries (an example of a "second batteries") 51B. The main battery 51A has an approximately rectangular parallelepiped body and is disposed forwardly of the driver's seat 11. More specifically, this main battery 51A is disposed in such a manner that the right/left center of this main battery 51A is in substantial alignment with the right/left center of the traveling vehicle body 10. In the instant embodiment, the main battery 51A may be disposed inside the front hood 45F, for instance.

Further, in the traveling vehicle body 10, as shown in FIG. 4 and FIG. 5, there are provided the pair of right and left supplementary batteries 51B (corresponding to second right battery and second left battery). The pair of supplementary batteries 51B are disposed substantially in symmetry relative to the right/left center of the traveling vehicle body 10, at rear portions of the traveling vehicle body 10. Thus, the pair of supplementary batteries 51B are disposed, at the rear portions of the traveling vehicle body 10, substantially in right/left symmetry across the main battery 51A. In the instant embodiment, the pair of right and left supplementary batteries 51B are disposed on the pair of right and left fenders 41 rearwardly of the driver's seat 11, with at least a part of the supplementary battery 51B being overlapped with the fender 41 associated therewith as seen from above.

Each of the right and left supplementary batteries 51B is approximately rectangular parallelepiped, and they are identical in shape and weight to each other. Thus, even when the supplementary batteries 51B are provided in addition to the main battery 51A, it is still possible to keep favorable weight balance in the right/left direction of the riding lawn mower.

[Mower Unit]

The configuration of the mower unit 3 is substantially same as that of the first embodiment. Although no mower blades are shown in the mower shown in FIG. 4 and FIG. 5, similar to the first embodiment, three mower blades are disposed side by side in the right/left direction. The mower blades are driven by an unillustrated blade motor which receives electric power from the battery 51.

[Electric System and Power System]

In the battery 51, the main battery 51A and the supplementary batteries 15B are connected to be switched over manually or automatically, via a switching mechanism (which may be configured like the switching mechanism 53 in the first embodiment, though not shown in FIGS. 4 and 5). Thus, as being switched by the switching mechanism, the main battery 51A or the supplementary batteries 51B may be connected to the driving wheel unit 2 and the mower unit 3. With the switching mechanism for switching over between the main battery 51A and the supplementary batteries 51B, when the stored power amount in the main battery 51A becomes short, for instance, it is possible to switch over to the supplementary batteries 51B manually or automatically. Whereby, a long working period for the riding electric lawn mower can be secured; and power charging can be effected separately to the main battery 51A and to the supplementary batteries 51B, and also power charging/discharging between the main battery 51A and the supplementary batteries 51B can be suppressed.

Preferably, the switching mechanism is configured to control the power amount from the main battery 51A to the motors and the power amount from the supplementary batteries 51B to the motors to be substantially equal to each other. Then, the driving wheel unit 2 and the mower unit 3 can be driven smoothly, as receiving no change in the power amounts before/after the switchover.

To receive electric power from the battery 51 to drive the driving wheel unit 2 and the mower unit 3, there are provided motors. For instance, motors are provided independently of each other, in correspondence with the driving wheel unit 2 and the mower unit 3, respectively. Such motors may be provided in correspondence with the left rear wheel 2a and the right rear wheel 2b, respectively (the motors may be configured like the motors 61, 62, 64 in the first embodiment, though not shown in FIGS. 4 and 5). However, it is also possible to provide a single motor in correspondence with the driving wheel unit 2 and the mower unit 3 and this single motor can be configured to supply driving power to the driving wheel unit 2 and the mower unit 3 respectively in distribution.

Since the supplementary motors 51B are provided in addition to the main battery 51A, it is possible to secure a longer operational period for the riding electric lawn mower than an arrangement including only the main battery 51A.

Further, since the main battery 51A is disposed at a front portion of the traveling vehicle body 10 at the substantial right/left center of the traveling vehicle body 10 and the supplementary batteries 51B are disposed at rear portions of the traveling vehicle body 10 in substantial right/left symmetry, there is achieved favorable weight balance in the right/left direction of the riding electric lawn mower. Thus, with effective suppression of tilting of the gravity center of the riding electric lawn mower to either right or left side, the riding electric lawn mower can travel and make a stop, etc. smoothly. Still further, the main battery 51A disposed at the front portion of the traveling vehicle body 10 and the supplementary batteries 51B disposed at the rear portions of the traveling vehicle body 10 achieves favorable weight balance in the front/rear direction of the riding electric lawn mower.

Moreover, as the supplementary batteries 51B are disposed on the right and left sides of the traveling vehicle body 10, these can be readily mounted/dismounted from the right and left sides of the traveling vehicle body 10.

Incidentally, in the riding electric lawn mower relating to the second embodiment, since the main battery 51A is disposed at a front portion of the traveling vehicle body 10 and the supplementary batteries 51B are disposed in substantial right/left symmetry, in the riding electric lawn mower having a free space at the front portion of the traveling vehicle body 10, it is possible to employ a battery layout taking weight balance into consideration.

Further, in the above-described embodiment, since the supplementary batteries 51B are disposed in correspondence with the respective fenders 41 that are provided on the right and left sides of the traveling vehicle body 10, these supplementary batteries 51B do not protrude from the right and left sides of the traveling vehicle body 10 prominently, so that the riding electric lawn mower can be formed compact.

Other Embodiments (1) In the first embodiment and the second embodiment described above, the riding electric lawn mower can include a stored power control section (not shown) which executes at least one of (i) display control for causing a display (not shown) to display stored power amounts stored in the main battery 51A and the supplementary batteries 51B and (ii) alarm control for effecting alarming in accordance with the stored power amounts.

As stored power amounts of the main battery 51A and the supplementary batteries 51B are displayed and/or alarmed according to the stored power amounts, a user can switch over between the main battery 51A and the supplementary batteries 51B in accordance with the stored power amounts.

The stored power control section can be preferably incorporated in the above-described controller 5 (ECU) or the switching mechanism 53, or can be provided in operable connection thereto in the vicinity of either one of them. However, the stored power control section may be provided in any other position or can be provided as an independent controller.

(2) In the first embodiment and the second embodiment described above, there was cited a riding electric lawn mower called zero-turn mower in which the left front wheel 1a and the right front wheel 1b can be controlled in their driving independently of each other. However, the present invention is applicable to a lawn mower in which the left rear wheel 2a and the right rear wheel 2b are operably coupled via differential mechanism, with the left front wheel 1a and the right front wheel 1b acting as steerable wheels. In this case, the motors receiving power supply from the batteries will provide rotational drive to the left front wheel 1a and the right front wheel 1b.

(3) In the foregoing embodiments, the mower unit 3 was equipped with three blades. Instead thereof, two or four or more blades can be provided.

(4) In the foregoing embodiments, a lawn mower having a mower unit was cited as an example. However, the electric lawn mower can omit the mower unit. Further, the invention is applicable to an electric work vehicle operated by electric power, other than a lawn mower.

(5) In the foregoing embodiments, in the periphery of the driver's seat 11, a pair of right and left fenders 41 are provided. However, the fenders 41 can be formed integral along the right/left direction around the driver's seat 11.

What is claimed is:

1. An electric work vehicle comprising:
a traveling vehicle body;
a wheel unit having wheels on the right and left sides of the traveling vehicle body;
a motor for supplying rotational drive force to the wheel unit;
a battery for supplying electric power to the motor, the battery including:
a first battery disposed at a right/left center of the traveling vehicle body, a right/left centerline of the first battery being in substantial alignment with a right/left centerline of the traveling body; and
second batteries disposed in symmetricity across the right/left centerline of the first battery and
right and left fenders that are disposed on the right and left sides of the traveling vehicle body,
wherein the second batteries are disposed on respective fenders, with at least a part of each of the second batteries being overlapped with the fender associated therewith in a top view of the traveling vehicle body.

2. The electric work vehicle as defined in claim 1, wherein:
the first battery is disposed at a rear portion of the traveling vehicle body; and
the second batteries are disposed in right/left symmetry across the first battery at the rear portion of the traveling vehicle body.

3. The electric work vehicle as defined in claim 1, wherein:
the first battery is disposed at a front portion of the traveling vehicle body; and
the second batteries are disposed at rear portions of the traveling vehicle body across the right/left centerline of the first battery.

4. The electric work vehicle as defined in claim 1, wherein:
the second batteries include a second right battery disposed on the right side of the traveling vehicle body and a second left battery disposed on the left side of the traveling vehicle body; and
the second left battery and the second right battery are identical in shape and weight to each other.

5. The electric work vehicle as defined in claim 1, further comprising:
a switching mechanism for manually or automatically switching between the first battery and the second batteries.

6. The electric work vehicle as defined in claim 5, wherein:
the switching mechanism controls an electric power amount supplied from the first battery to the motor and an electric power amount supplied from the second batteries to the motor to be substantially equal to each other.

7. The electric work vehicle as defined in claim 1, further comprising:
a stored electric power control section configured to effect at least one of (i) a display control for displaying stored power amounts stored in the first battery and the second batteries and (ii) an alarm control for effecting alarming in accordance with the stored power mounts.

8. The electric work vehicle as defined in claim 1, wherein an even number of the second batteries are provided and only a single first battery is provided.

9. The electric work vehicle as defined in claim 8, wherein the second batteries are sized identically to each other in the top view of the traveling vehicle body.

* * * * *